March 16, 1926.

F. ARNOLD

COMBINATION TOOL

Filed April 15, 1925

1,577,095

Inventor
Frank Arnold

By

Attorneys

Patented Mar. 16, 1926.

1,577,095

UNITED STATES PATENT OFFICE.

FRANK ARNOLD, OF BRIDGEPORT, CONNECTICUT.

COMBINATION TOOL.

Application filed April 15, 1925. Serial No. 23,345.

*To all whom it may concern:*

Be it known that I, FRANK ARNOLD, a citizen of the United States, residing at Bridgeport, in the county of Fairfield and State of Connecticut, have invented certain new and useful Improvements in Combination Tools, of which the following is a specification.

This invention relates to fish-hook extractors, and contemplates combining a fish-hook extractor with a handle tool in such a way that it will not interfere with the normal use and operation of the tool.

Various devices have been proposed for the purpose of facilitating the extraction of hooks from the mouths of fish. For the most part these devices have been special tools, adapted to this and no other purpose. Even when a fish-hook extractor has been combined with another tool, such as a pocket-knife, the construction of the extractor has been such as to greatly alter the appearance of the knife, and to interfere with its facile and effective manipulation. For fishing, or hunting and fishing excursions, a combination tool is desirable, which is easy of manipulation, unencumbered by extraneous attachments, is available at all times for cutting purposes, and is equally effective as a fish-hook extractor when the need for such a device arises.

The present invention supplies a tool for this purpose, one form of which is shown in the accompanying drawing.

Figure 1:
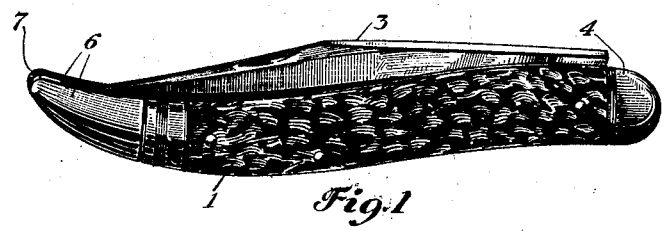
Fig. 1 is a perspective of a combination tool embodying the invention.
Figure 2:
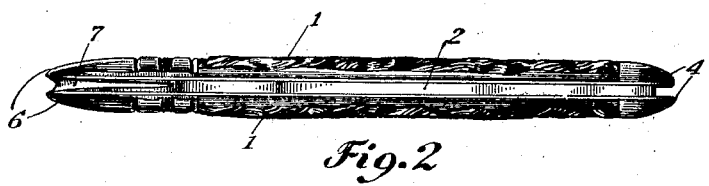
Fig. 2 is a back view of the tool shown in Fig. 1.
Figure 3:
Fig. 3 is a front view of the tool shown in Fig. 1.

For the purpose of illustrating one application of the invention a pocket-knife embodying the same has been shown. The knife comprises handles 1, a back spring 2, and a blade 3, which is pivoted between bolsters 4. The handle has a curving outline, and tapers away from the blade pivot, and a narrowed and curving end opposite the blade pivot is covered by the elongated bolsters or caps 6.

A groove or recess 7 is formed in the back spring 2, adjacent to and extending around the end thereof which is included between the bolsters 6. This groove may begin at a point on the back a short distance, say about one inch, from the end of the handle, and increase in width and depth toward the end of the handle. The groove is preferably of arcuate cross-section.

It will be seen that when this tool is to be used as a fish-hook extractor the groove 7 may be guided to engage the hook by passing the fish-line along the body of the knife. The tapering and curved end of the handle conforms generally to the configuration of the hook, but is not as wide as the hook, whereby prompt and effective extraction of the hook is insured. Furthermore, when the knife is to be used for other purposes, or is carried in the pocket, it is not encumbered with any attachments or projecting parts.

I claim:

1. A pocket combination tool having a handle comprising similar and oppositely disposed grip members, a back member spacing and adjoining said grip members, and a fish-hook extracting recess formed in said back member.

2. A pocket combination tool comprising a handle having a grip portion and an end section whose transverse dimensions do not exceed the transverse dimensions of said grip portion, and a fish-hook extractor formed within said end section.

3. A pocket combination tool comprising a handle adapted for pivotal attachment of a tool adjacent one end thereof, said handle constantly decreasing in width toward its opposite end, and a fish-hook extractor formed within the opposite end or said handle.

4. A pocket combination tool comprising a curved and tapering handle, the narrowed end of said handle being covered by elongated bolsters, the back between said bolsters being recessed to form a fish-hook extractor.

5. A pocket combination tool comprising a curved and tapering handle, a back spring, a fish-hook extractor comprising a recess in said back spring beginning at a point adjacent to the narrowed end of the handle and increasing in width and depth toward and extending around the narrowed end of the handle.

FRANK ARNOLD.